US012023288B2

(12) United States Patent
Ulreich

(10) Patent No.: US 12,023,288 B2
(45) Date of Patent: Jul. 2, 2024

(54) PATIENT HANDLING APPARATUS AND METHOD OF USE

(71) Applicant: Sage Products, LLC, Cary, IL (US)

(72) Inventor: Daniel R. Ulreich, Cary, IL (US)

(73) Assignee: Sage Products, LLC, Cary, IL (US)

( * ) Notice: Subject to any disclaimer, the term of this patent is extended or adjusted under 35 U.S.C. 154(b) by 221 days.

(21) Appl. No.: 16/249,677

(22) Filed: Jan. 16, 2019

(65) Prior Publication Data

US 2019/0216663 A1 Jul. 18, 2019

Related U.S. Application Data

(60) Provisional application No. 62/618,482, filed on Jan. 17, 2018.

(51) Int. Cl.
*A61G 7/10* (2006.01)
*A61G 7/057* (2006.01)

(52) U.S. Cl.
CPC ....... *A61G 7/1028* (2013.01); *A61G 7/05769* (2013.01); *A61G 7/1026* (2013.01)

(58) Field of Classification Search
CPC ...... A61G 7/10; A61G 7/1021; A61G 7/1013; A61G 7/1023; A61G 7/1028; A61G 7/1026; A61G 7/05769; A61G 7/05776; A61G 13/126; A61G 13/1265; A61G 13/1275; A61G 7/1025; A61G 7/065; A61G 7/07; A61G 7/072; A61G 7/075; A61G 7/0755; F16K 7/10; F16K 15/20; F16K 15/202; A63B 41/00; A47C 4/54; A47C 27/08; A47C 27/081; A47C 27/082; A47C 27/083
See application file for complete search history.

(56) References Cited

U.S. PATENT DOCUMENTS 4,091,482 A * 5/1978 Malcolm ................ A47G 9/086 428/100
5,033,133 A * 7/1991 Nissen ................. A47C 27/088 5/653
5,974,608 A * 11/1999 Haller .................. A47C 27/084 5/709

(Continued)

FOREIGN PATENT DOCUMENTS

GB 2529954 A * 3/2016 ........... A61G 5/1002

*Primary Examiner* — Justin C Mikowski
*Assistant Examiner* — Amanda L Bailey
(74) *Attorney, Agent, or Firm* — FOLEY & LARDNER LLP

(57) ABSTRACT

An inflatable device includes a top sheet and a bottom sheet to define a cavity when inflated such that the top sheet forms a top wall of the cavity and the bottom sheet forms a bottom wall of the cavity. The device includes a cavity junction connecting the top sheet and the bottom sheet configured to separate the cavity into a first cavity and a second cavity. The device includes a first port having a first opening in fluid communication with the first cavity and configured to allow passage of air into the first cavity. The device includes a second port having a second opening in fluid communication with the second cavity and configured to allow passage of air into the second cavity. The device further includes an opening in the cavity junction configured to allow air flow from the second cavity into the first cavity.

15 Claims, 10 Drawing Sheets

(56) References Cited

U.S. PATENT DOCUMENTS

| | | | | |
|---|---|---|---|---|
| 6,463,610 | B1 * | 10/2002 | Shulte | A47C 27/081 5/706 |
| 6,996,867 | B2 * | 2/2006 | Boso | A47C 27/082 5/424 |
| 7,107,641 | B2 * | 9/2006 | Davis | A61G 7/1028 5/710 |
| 7,376,995 | B2 * | 5/2008 | Davis | A61G 7/1026 5/710 |
| 7,478,448 | B2 * | 1/2009 | Boso | A47C 27/081 5/711 |
| 9,849,053 | B2 | 12/2017 | Rigoni et al. | |
| 10,058,190 | B1 * | 8/2018 | Blazar | A47C 27/148 |
| 10,384,414 | B2 * | 8/2019 | Marson | B32B 5/18 |
| 10,765,576 | B2 * | 9/2020 | Rigoni | A61G 7/001 |
| 2002/0133879 | A1 * | 9/2002 | Smith | A47G 9/086 5/413 R |
| 2002/0148045 | A1 * | 10/2002 | Giori | A47C 27/088 5/709 |
| 2003/0200611 | A1 * | 10/2003 | Chaffee | A47C 27/081 5/710 |
| 2004/0003471 | A1 * | 1/2004 | VanSteenburg | A47C 27/081 5/709 |
| 2005/0044634 | A1 * | 3/2005 | Wang | A47C 27/084 5/709 |
| 2005/0229320 | A1 * | 10/2005 | Wu | A47C 27/088 5/706 |
| 2006/0174416 | A1 * | 8/2006 | Wu | A47C 27/081 5/710 |
| 2007/0094805 | A1 * | 5/2007 | Davis | A61G 7/0755 5/81.1 R |
| 2011/0083280 | A1 * | 4/2011 | Davis | A47C 27/081 5/712 |
| 2014/0007343 | A1 * | 1/2014 | Davis | A61G 7/1021 5/83.1 |
| 2014/0209184 | A1 * | 7/2014 | Frayne | A47C 27/088 137/223 |
| 2014/0298589 | A1 * | 10/2014 | Bailey | A47C 27/081 5/710 |
| 2017/0049646 | A1 * | 2/2017 | Rigoni | A61G 7/1028 |
| 2017/0119608 | A1 * | 5/2017 | Rigoni | A61G 7/001 |
| 2017/0216117 | A1 * | 8/2017 | Rigoni | A61G 7/05715 |
| 2018/0369050 | A1 * | 12/2018 | Davis | A61G 13/12 |
| 2019/0216663 | A1 * | 7/2019 | Ulreich | A61G 7/1026 |

* cited by examiner

PATIENT HANDLING APPARATUS AND METHOD OF USE

CROSS-REFERENCE TO RELATED APPLICATIONS

This application claims the benefit of and priority to U.S. Provisional Patent Application No. 62/618,482, filed Jan. 17, 2018, which is hereby incorporated by reference in its entirety.

BACKGROUND

The present description generally relates to an apparatus, system, and method for boosting, transferring, turning, and positioning a person on a bed or the like, and, more particularly, to an inflatable patient support device having two separately inflatable sections allowing different configurations of the device for different needs and uses, as well as systems and methods including one or more of such apparatuses.

Nurses and other caregivers at hospitals, assisted living facilities, and other locations often care for patients with limited or no mobility, many of whom are critically ill or injured and/or are bedridden. Caregivers often need to move patients to or from a bed surface for transport, treatment, or examination of the patient, or manipulate a patient's position on the surface. Patients who are unconscious, disabled, or otherwise unable to move under their own power often require the assistance of multiple caregivers to accomplish these movements. The patient transfer and positioning process has traditionally relied upon one or more of several methods, including the use of folded bedsheets ("drawsheets") or rigid transfer boards in concert with the exertion of strong pushing or pulling forces by the caregivers to accomplish the move. The process may be complicated by the size of the patient, the patient's level of disability, and/or the patient's state of consciousness.

In addition to being difficult and time-consuming, turning, positioning, transferring and/or boosting patients, types of "patient handling" activities, can result in injury to healthcare workers who push, pull, or lift the patient's body weight. For healthcare workers, the most prevalent cause of injuries resulting in days away from work is overexertion or bodily reaction, which includes motions such as lifting, bending, or reaching and is often related to patient handling.

In recognition of the risk and frequency of healthcare worker injuries associated with patient handling, safe patient handling procedures and/or protocols are often implemented in the healthcare setting. These protocols stress that methods for moving patients should incorporate a form of assistive device to reduce the effort required to handle the patient, thus minimizing the potential for injury to healthcare workers. Such assistance may be accomplished, for example, with the use of low-friction sheets or air assisted patient transfer devices that utilize forced air to reduce the physical exertion needed from healthcare workers to accomplish the task of moving a patient.

Currently available transfer devices may be specifically sized and configured for either patient positioning or patient transfer. For example, longer devices may be used for patient transfer, while shorter devices assist with patient positioning (such as changing the positioning of the patient on the bed surface). It may be necessary for a caregiver to move the patient from one such device to another when it is time to change from patient positioning to patient transfer. This takes time and results in additional patient manipulation to get the proper device positioned under the patient.

The present disclosure seeks to overcome certain limitations and other drawbacks of existing devices, systems, and methods, and to provide new features not heretofore available.

DETAILED DESCRIPTION

In general, the disclosure relates to a system or apparatus, including an inflatable patient handling device, having two separately inflatable sections. Various embodiments are described below.

Figure 1:
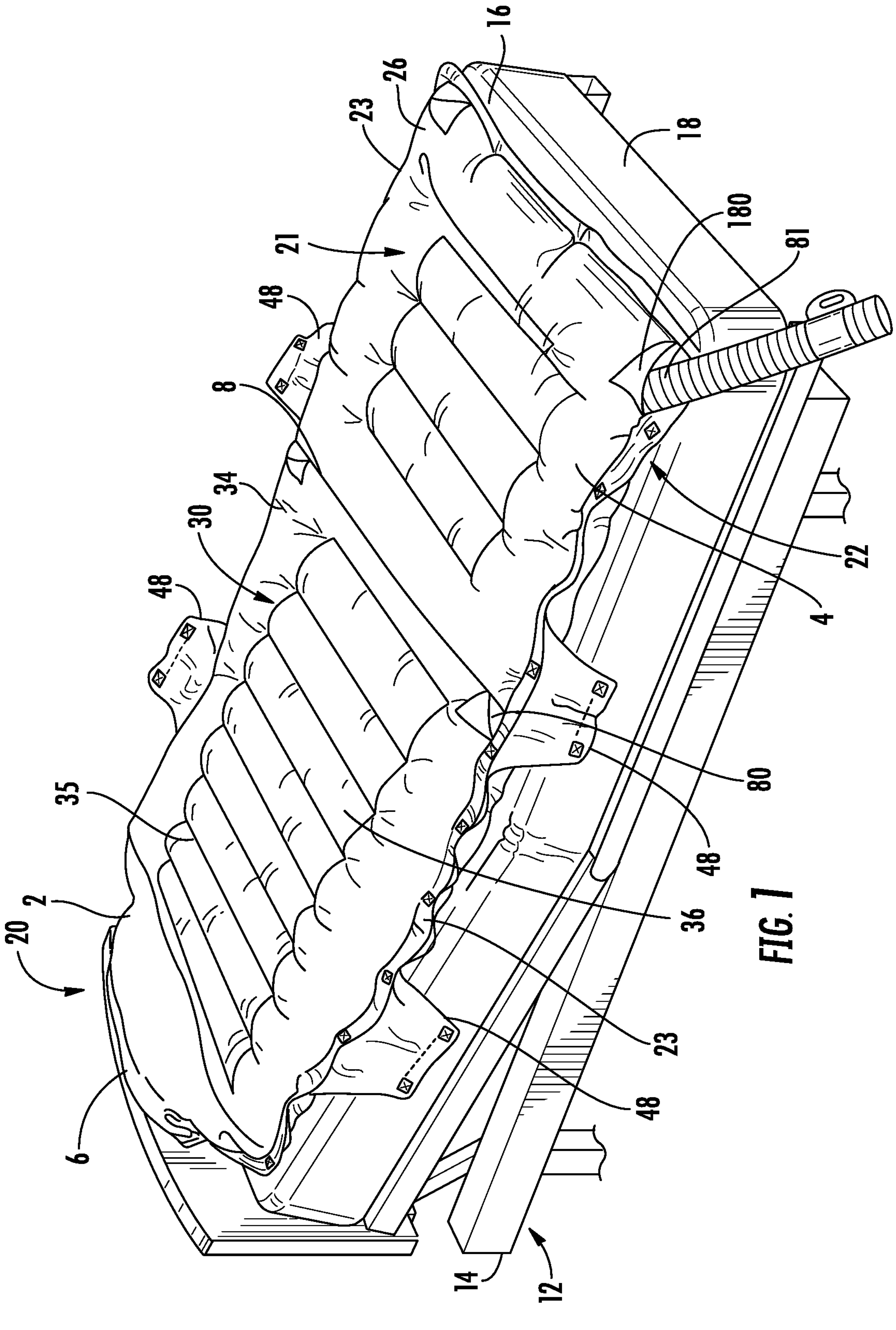
FIG. 1 is a perspective view an inflatable device for use in patient handling, according to an embodiment.
Figure 2:
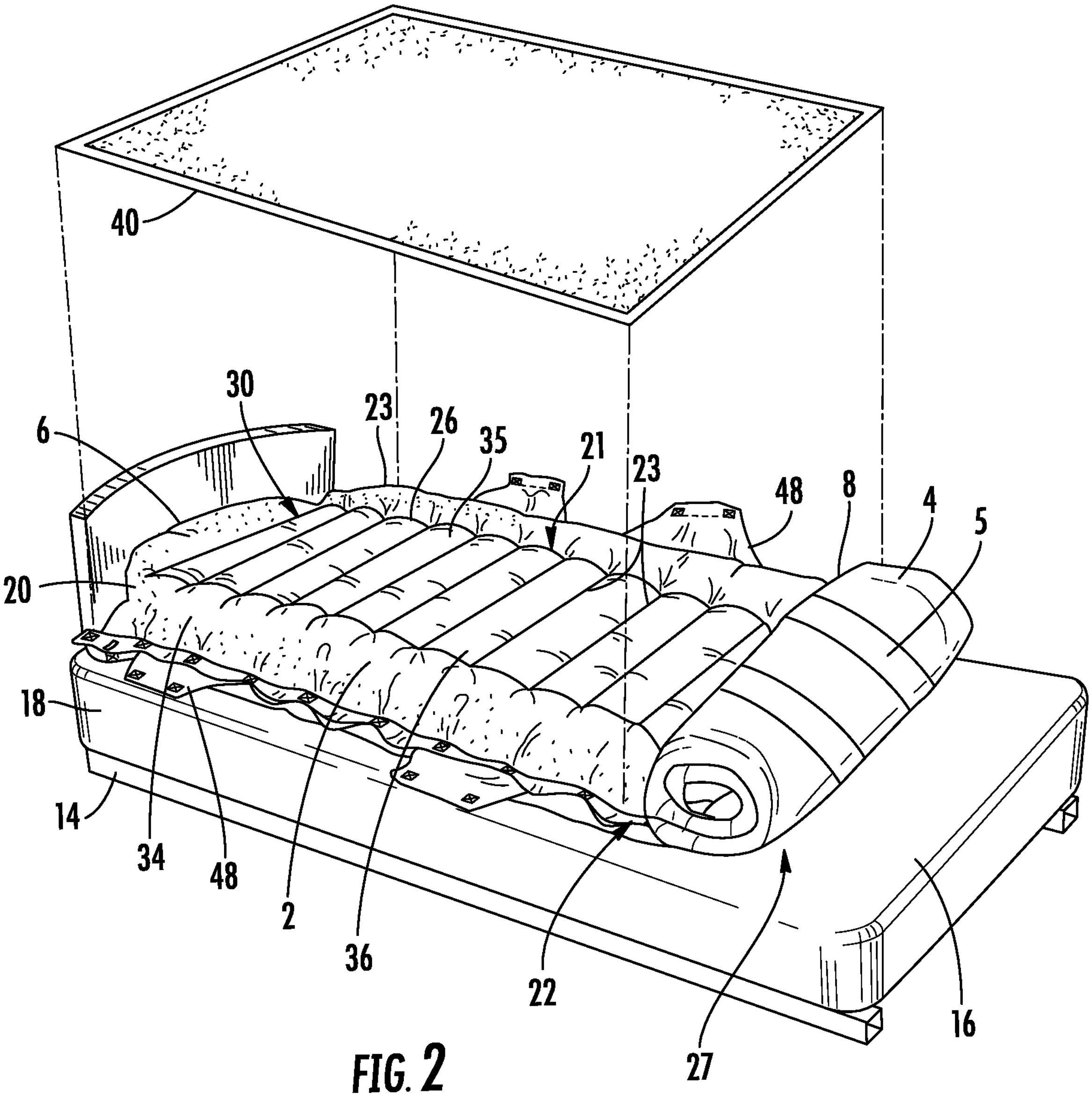
FIG. 2 is a partially-exploded perspective view of a system including the inflatable device of FIG. 1, according to an embodiment.

Referring now to FIG. 1, a perspective view of one embodiment of an inflatable patient handling device 20 for use in boosting, transferring, turning, or positioning a person resting on a surface, such as a patient lying on a hospital bed is shown. As shown in FIG. 1, the inflatable patient handling device (hereinafter, "device") 20 includes a first section 2 and second section 4 which are configured such that in a first configuration, one of the sections (in this embodiment, first section 2) is inflatable independent of the other, and in a second configuration, both sections are inflatable together. First section 2 and second section 4 are separated by a cavity junction 8. In the embodiments shown, first section 2 is longer than second section 4, however, in other embodiments, both sections may be the same length, or the second section 4 may be longer than the first section 2. FIG. 1 depicts a configuration where both sections are inflated, and FIG. 2 depicts a configuration where only first section 2 is inflated and second section 4 is stowed.

As shown in FIG. 1, the device 20 may be placed on a bed 12 or other support apparatus for supporting a person in the supine position. The bed 12 generally includes a frame 14 and a supporting surface 16 supported by the frame 14, as shown in FIGS. 1-2. The supporting surface 16 can be provided by a mattress 18 or similar structure. The bed 12 may have thereon one or more bed sheets (such as a fitted sheet or flat sheet), as well as pillows, blankets, additional sheets, and other components known in the art. Further, the bed 12 may be an adjustable bed, such as a typical hospital-type bed, where the head (or other parts) of the bed 12 can be raised and lowered, such as to incline the patient's upper body. The device 20 and the components thereof can be used with other types of beds 12 as well.

One embodiment of the inflatable patient support device 20 is shown in detail in FIGS. 1-5. In general, the device 20 is flexible and foldable when in the non-inflated state, and has a top surface 21 and a bottom surface 22 defined by a peripheral edges 23. The device 20 is configured to be positioned on the bed 12 so that the bottom surface 22 is above the supporting surface 16 of the bed 12 and faces or confronts the supporting surface 16, and is supported by the supporting surface 16. In the embodiment shown in FIG. 2, it is shown that an absorbent body pad 40 may be placed on top of and used in conjunction with the device 20. As used herein, "above," "below," "over," and "under" do not imply direct contact or engagement. For example, the bottom surface 22 being above the supporting surface 16 means that that the bottom surface 22 may be in contact with the supporting surface 16, or may face or confront the supporting surface 16 and/or be supported by the supporting surface 16 with one or more structures located between the bottom surface 22 and the supporting surface 16, such as a bed sheet as described above. Likewise, "facing" or "confronting" does not imply direct contact or engagement, and may include one or more structures located between the surface and the structure it is confronting or facing.

According to the embodiment of FIGS. 1-5, the device 20 is a generally rectangular shape. The shape of the device 20 may be different in other embodiments, including an irregular hexagonal shape. In the embodiment shown in FIGS. 1-2, the device 20 further includes an extension forming a pillow 6 at the end closest to the head. The device 20 forms an inflatable body 30 including a first cavity 24 formed in first section 2 and a second cavity 25 formed in second section 4, separated by a cavity junction 8 (see FIG. 4). The first cavity 24 and the second cavity 25 are separated by the cavity junction 8, so that in a first configuration, the first cavity 24 is inflatable independent of the second cavity 25 and in a second configuration, both the first cavity 24 and the second cavity 25 can be inflated together, which will be explained in greater detail below. The cavity junction 8 may be formed by connecting the top sheet 26 to the bottom sheet 27 or connecting the first section 2 to the second section 4 by any connection means, such as stitching, adhesive, welding, and/or other connection techniques or combinations of such techniques. Openings 182 are formed by breaks in the cavity junction 8, providing a fluid connection between first cavity 24 and second cavity 25.

Figure 3:
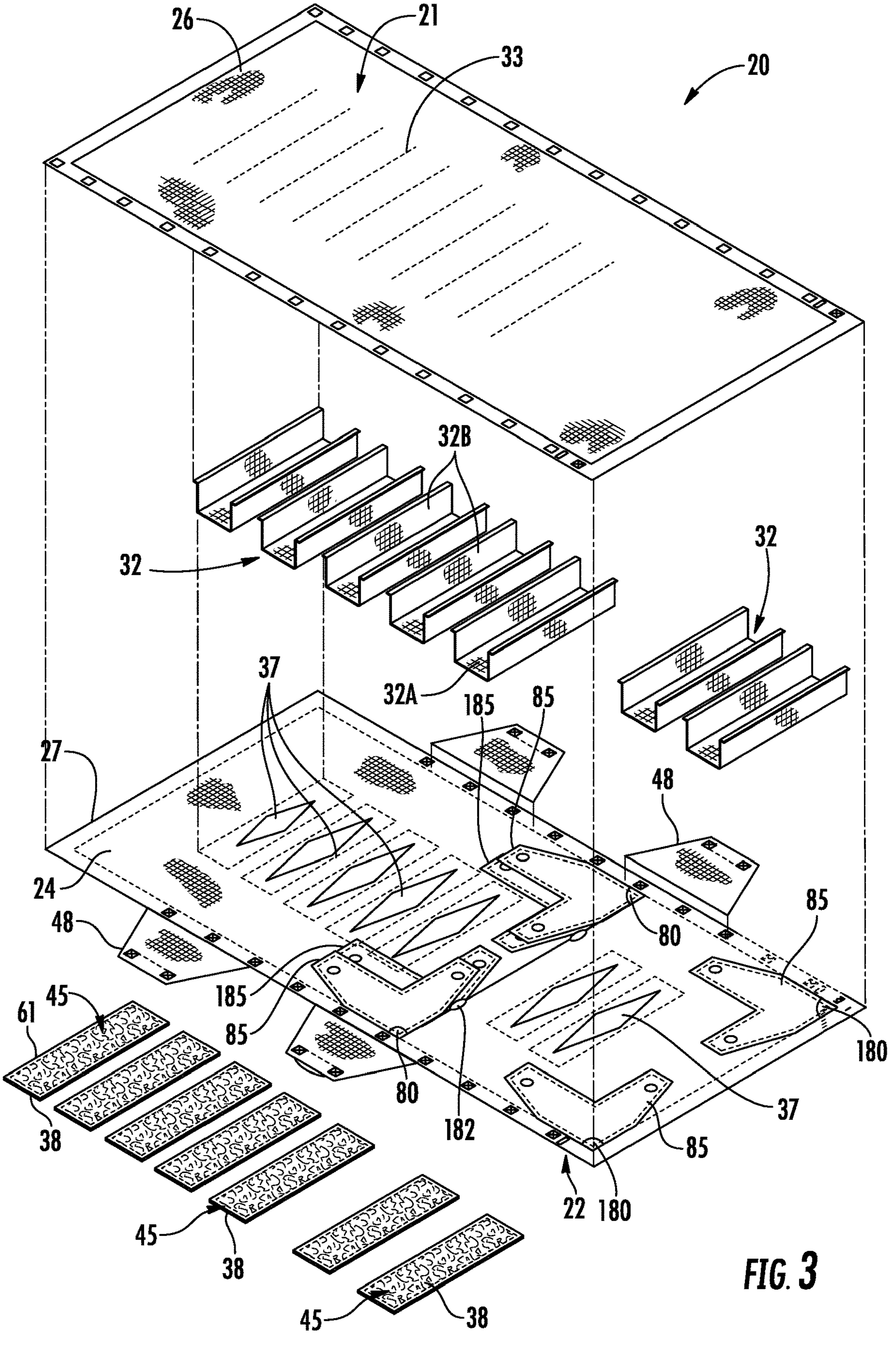
FIG. 3 is an exploded perspective view of the inflatable device of FIG. 1, according to an embodiment.
Figure 4:
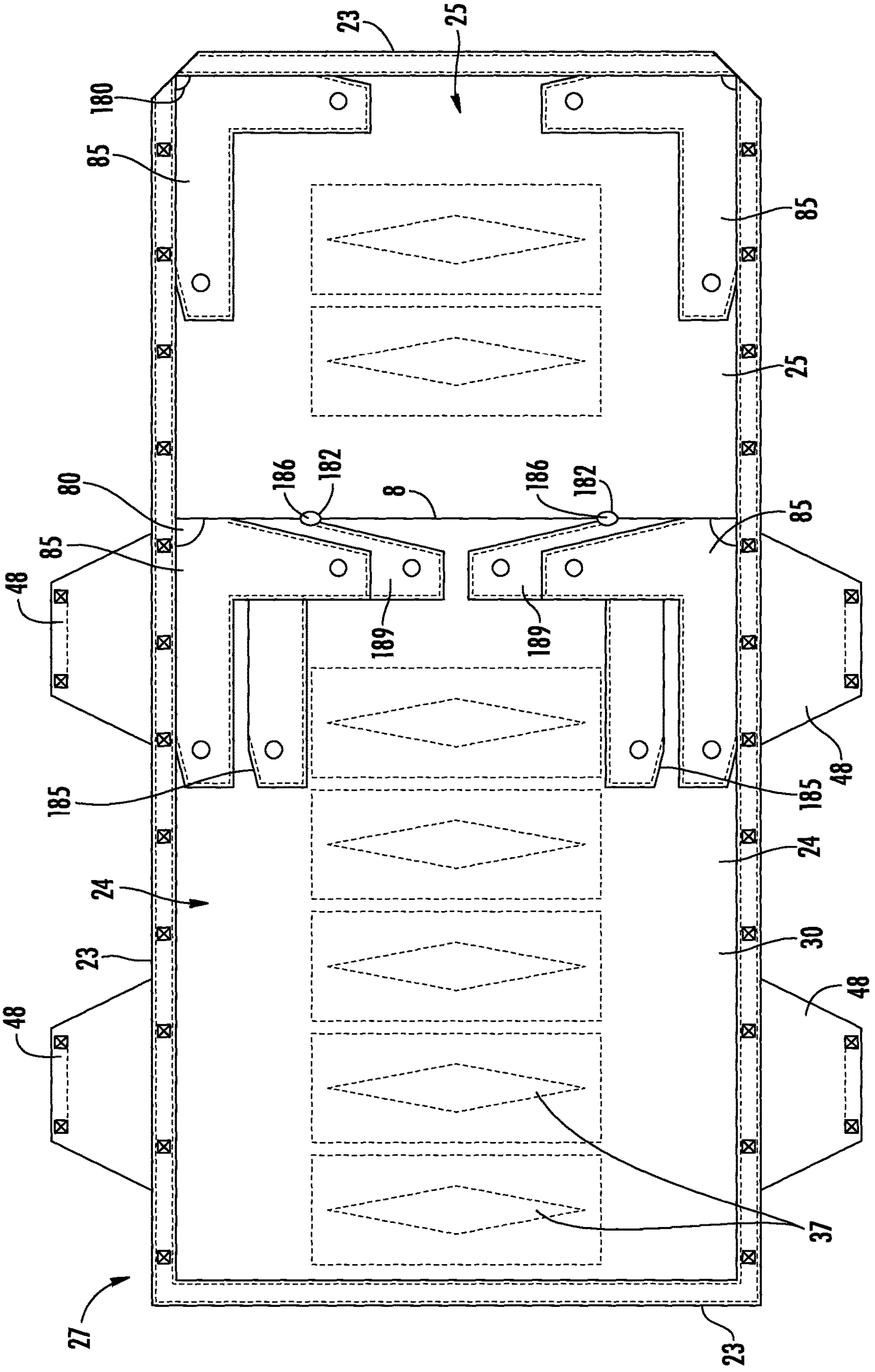
FIG. 4 is a top view of the bottom sheet of the device of FIG. 1, with the top sheet removed, according to an embodiment.
Figure 5:
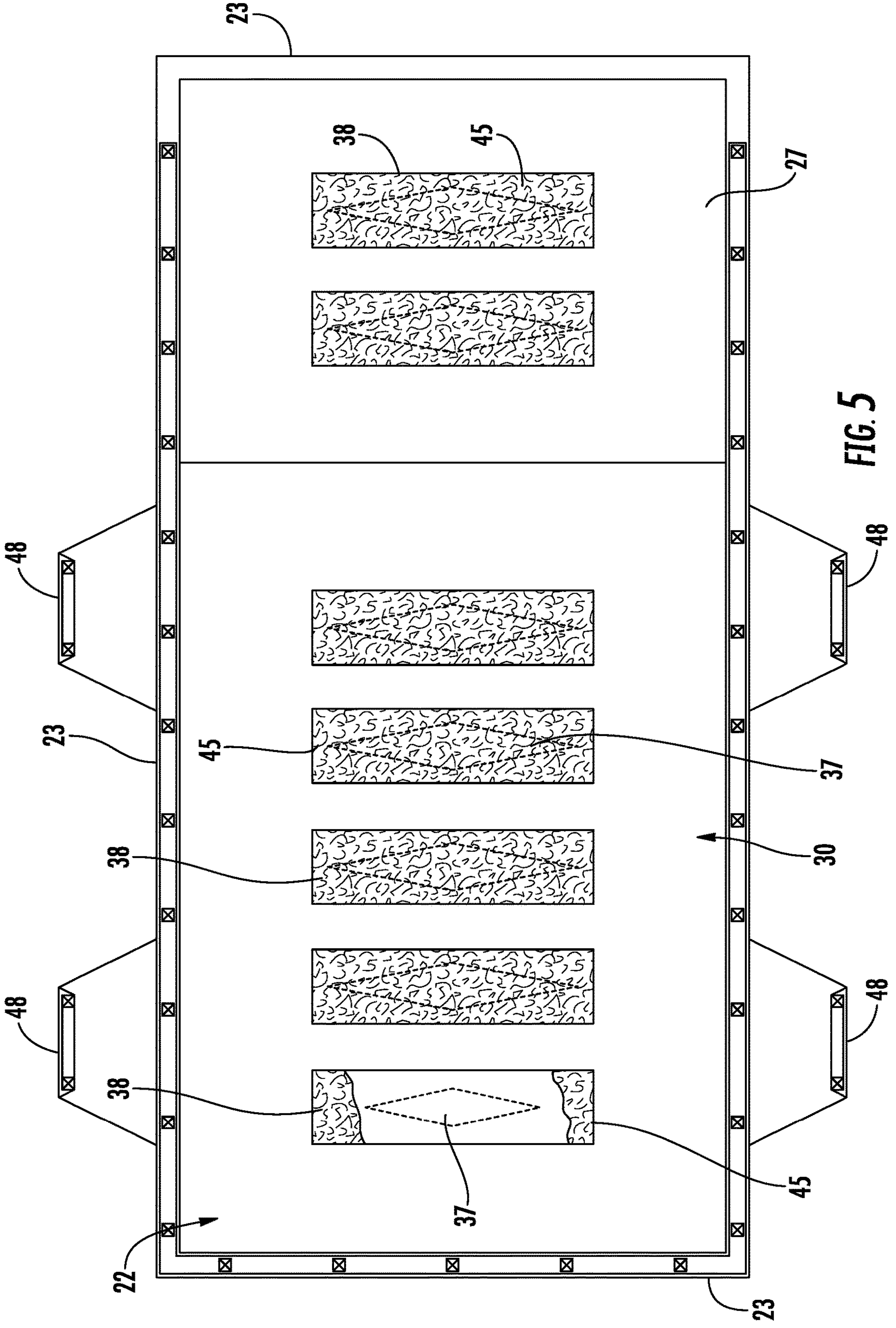
FIG. 5 is a bottom view of the device of FIG. 1, according to an embodiment.

Referring now to FIGS. 4 and 5, the inflatable body 30 is defined by at least a top sheet 26 forming a top wall of the first cavity 24 and second cavity 25, and a bottom sheet 27 forming a bottom wall of the first cavity 24 and the second cavity 25, with the top sheet 26 and the bottom sheet 27 connected together to define cavities 24 and 25 there between. In the embodiment shown in FIGS. 1-5, the top and bottom sheets 26, 27 are two separate pieces of sheet material that are connected together around their peripheries, such as by stitching and/or adhesives, or one or more other connection techniques described herein. The top and bottom sheets, 26, 27 are then stitched or otherwise connected along cavity junction 8 to create first cavity and second cavity 24, 25. In other embodiments, the top and bottom sheets 26, 27 may be made from a single piece of material that is folded over and connected by stitching along the free ends or that is formed in a loop, or the top and/or bottom sheets 26, 27 may be formed of multiple pieces. Both the top and bottom sheets 26, 27 may be formed of the same material in one embodiment, although these components may be formed of different materials in another embodiment. Either or both of the sheets 26, 27 may have a single layer or multiple layers that may be formed of the same or different materials. In some embodiments, the top sheet of the first section 2 may be separate from the top sheet of the second section 4, and similarly, the bottom sheet of the first section 2 may be separate from the bottom sheet of the second section 4.

The sheet material(s) of the top and bottom sheets 26, 27 may have properties that are desirable for a particular application. For example, the sheets 26, 27 may be breathable fabrics or other materials that have sufficient resistance to air passage to retain inflation of the inflatable body 30, while maintaining sufficient breathability to allow passage of heat and moisture vapor away from the patient, thereby enabling the device 20 to be left beneath a patient indefinitely, or at least the length of the patient's stay at the healthcare facility. The material(s) of the top and bottom sheets 26, 27 may also include specific frictional properties, as described herein. Additionally, the material of the top and bottom sheets 26, 27 may have greater permeability to water vapor (i.e., breathability) than its permeability to liquid or air. For example, the top and/or bottom sheets 26, 27 may be formed of a material that is liquid repellant and/or impermeable and may have little to no air permeability, while being permeable to moisture vapor. In one embodiment, the top and bottom sheets 26, 27 may be formed of polyester and/or nylon (polyamide), for example, a coated nylon taffeta material, which can provide these properties. The coating on the sheets 26, 27 has a higher coefficient of friction than the sheet material itself, creating a configuration with a high-friction material (the coating) on one surface and a low-friction material (the sheet material) on the opposite side.

Referring now to the exploded view in FIG. 3, the device 20 may include one or more inflation-limiting members to create a specific inflated shape for the device 20. In the embodiment shown, the inflatable body 30 has gussets 32 connected to the top sheet 26 and the bottom sheet 27 and extending across the first cavity 24 of the first section 2 and the second cavity 25 of second section 4. In other embodiments, gussets may extend only across the first cavity 24 of the first section 2. The gussets 32, in the embodiment shown, are U-shaped in cross-section, having a base 32A connected to one of the top and bottom sheets 26, 27, with two arms 32B extending across the cavity 24, 25 between the top and bottom sheets 26, 27. In the embodiment of FIGS. 1-5, the base 32A is connected to the bottom sheet 27, and each of the arms 32B is connected at opposite ends to the bottom sheet 27 and the top sheet 26. The gussets 32 are elongated, such that the U-shaped cross-section is extended in a direction between the side edges 23 and generally parallel to the head and foot edges 23 of the device 20. In this configuration, the base 32A and the two arms 32B of each gusset 32 are formed as generally planar sheet structures that are under tension when the device 20 is inflated, and the arms 32B form walls extending between the top and bottom sheets 26, 27. The gussets 32 may be connected to the sheets 26, 27 by stitching in one embodiment, and other connection techniques may additionally or alternately be used as well.

In the embodiment of FIGS. 1-5, the gussets 32 are connected along gusset connections 33 that extend in a direction between the side edges 23 and generally parallel to the head and foot edges 23 of the device 20, but the gussets 32 may be connected along gusset connections 33 that extend in a direction between the head and foot edges 23 and generally perpendicular to the head and foot edges 23 of the device 20. The gussets 32 may also be connected along gusset connections 33 that extend in an oblique direction between the head and foot edges 23, neither parallel nor perpendicular to the head and foot edges 23 of the device. The gusset connections 33 may be formed by stitching, adhesive, welding, and/or other connection techniques or combinations of such techniques. The device 20 includes five gussets 32 and ten total gusset arms 32B for the first cavity 24 and 2 gussets and 4 total gusset arms 32B for the second cavity 25 in the embodiment illustrated in FIGS. 1-5, but may instead include any number of gussets 32, such as to create a different inflated configuration or depending on the size of the device 20 and/or the width/spacing of the gussets 32. In other embodiments, the device 20 may include a different configuration of gussets 32, or the device 20 may include a different type of inflation-limiting structure, such as threads, wires, narrow strips of material, etc., that connect the top and bottom sheets 26, 27 to limit inflation. For example, the gussets 32 may include only a single arm 32B and no base 32A or the top sheet 26 may be stitched directly to the bottom sheet 27.

Referring particularly to FIGS. 1-2, the inflated device 20 has a shape that is defined by the configuration of the edges 23 of the device 20 and the size, shape, and configurations of the gussets 32, among other factors. In one embodiment, the top surface 21 of the device 20 has a peripheral cushion 34 around at least some of the edges 23 of the device 20 and a central area 35 at least partially surrounded by the peripheral cushion 34. For example, the peripheral cushion 34 extends along all edges 23 of the device 20 within the first section 2, so that the central area 35 is surrounded on all sides by the peripheral cushion 34. In another embodiment, the peripheral cushion 34 may extend only on the left and right side edges 23 of the device 20, so that the cushion 34 borders the left and right sides of the central area 35. In some embodiments, the peripheral cushion 34 is raised with respect to at least a portion of the central area 35, to resist sliding or rolling of the patient off of the device 20 when the device is inflated. The central area 35 also includes swells 36 extending between the gusset connections 33 of the gussets 32. In some embodiments, not shown, the bottom surface 22 of the device 20 may have a similar structure when inflated, with a peripheral cushion 34 bordering a central area 35 with swells 36, where at least a portion of the central area 35 is recessed with respect to the cushion 34. The inflated device 20 may have a different shape when under force, e.g., when a patient is positioned on top of and compressing the device 20.

Referring particularly to FIGS. 3-5, in one embodiment, the device 20 also includes passages 37 in the bottom sheet 27 that permit air to pass from the first cavity 24 and/or second cavity 25 to the exterior of the device 20. The passages 37 extend from the first cavity 24 and/or second cavity 25 through the bottom sheet 27 to the exterior of the device 20 on the bottom surface 22. Air passing through the passages 37 is forced between the bottom surface 22 of the device 20 and the surface upon which the device 20 sits (e.g., the supporting surface 16 of the bed 12), reducing friction between the bottom surface 22 and the supporting surface 16. This permits easier movement of the device 20 when a patient is positioned on the device 20. The passages 37 in the embodiment of FIGS. 1-5 are located within the central area 35 on the bottom surface 22, between the gusset connections 33 of the gussets 32. Additionally, in this embodiment, the passages 37 are located immediately below the bases 32A of one or more of the gussets 32. In the embodiment of FIGS. 1-5, all of the gussets 32 have passages 37 beneath their bases 32A, and all of the passages 37 are located beneath one of the gusset bases 32A. In other embodiments, at least some (or all) of the passages 37 may be located in areas outside of or between the bases 32A of the gussets 32. In this embodiment, the passages 37 are diamond-shaped openings formed in the bottom sheet 27. In other embodiments, the passages 37 may be perforations, holes, openings, etc. of any shape or size which provide for the passage of air and the reduction of friction between the bottom surface 22 and the supporting surface 16. Such passages may include several small holes approximately the size of a pin hole, through which air can pass. In an embodiment having these small holes, a large number of holes may be positioned in a distinct area to provide a similar effect as the larger passage 37 of the embodiments shown herein.

In some embodiments, there is a portion of directional stitching material 45 positioned on the bottom of the device 20. In the embodiment shown, the directional stitching material 45 is in the form of covers 38 which cover each passage 37 (as seen in FIGS. 3 and 5). The material of the covers 38 allows airflow through while also providing directional friction properties, as described in US Patent Application Publication No. 2017/0049646, entitled "Apparatus and System for Boosting, Transferring, Turning and Positioning a Patient" which is incorporated by reference herein in its entirety. The covers 38 may be connected to the bottom surface 22 of the device 20 by stitching the cover 38 to the bottom sheet 27 around the perimeter of each cover 38. In other embodiments, the passages 37 may not be covered by covers 38.

The directional stitching material 45 on the bottom surface 22 of the device 20, e.g., the covers 38 in the embodiment of FIGS. 1-5, permits movement of the device 20 in desired directions and resist movement of the device 20 in undesired directions. In another embodiment, the device 20 may have one or more such portions of directional stitching material 45 on the bottom surface 22 that are not configured as covers 38 for the passages 37, and such an embodiment may additionally have covers 38 that may or may not be formed of a directional stitching material 45, or such an embodiment may have no covers 38.

In one embodiment, as illustrated in FIGS. 1-5, the device 20 may also include one or more handles 48 to facilitate pulling and other movement of the device 20. Such handles 48 may be configured for multiple different types of movement, including "boosting" the patient on the bed 12 (i.e., moving the patient toward the head), positioning the patient on the bed 12, pulling the patient up onto positioning wedges, moving the patient from one bed 12 or other surface to another, etc. As shown in FIGS. 1-5, the device 20 includes handles 48 in the form of flaps that are connected (e.g., stitched) to the bottom surface 22 of the device 20 and extend outwardly from the device 20. The handles 48 extend generally outward from the side edges 23 of the device 20, and in the embodiment of FIGS. 1-5, the device 20 has two handles 48 on each side. In the embodiments shown, all of the handles 48 are located within first section 2 of the device. In other embodiments, there may be additional handles 48 located on the second section 4. The wide base of the handles 48 spreads the force exerted on the device 20 over a larger area, which puts less pressure on the patient during positioning. In other embodiments, the device 20 may include a different number or configuration of the handles 48 as described above. Further, the handles 48 may be connected to the device 20 in a different way, such as by heat welding, sonic welding, adhesive, etc., or in a different location. Other types of handles may be utilized in further embodiments.

The device 20 includes one or more inflation ports 80, 180 for connection to an air output 81. In the embodiment of FIGS. 1-5, the device 20 includes a first set of inflation ports 80, each located along the mid-section of the left and right side edges 23 and configured to provide for the passage of air into the first section 2 for inflation of the first section 2. A second set of inflation ports 180 are located along opposing side edges 23 of the device 20, proximate the foot edge and configured to provide for the passage of air into the second section 4, from which air passes into the first section 2, for inflation of both the second section 4 and the first section 2. Generally, only one inflation port out of the set of first and second sets of inflation ports 80, 180 is used at a time, and the additional ports provide for use in diverse arrangements. Additional details of the ports 80, 180 and additional embodiments thereof are described elsewhere herein. The one or more inflation ports 80 can be located anywhere they are in fluid communication with the first section 2. The one or more inflation ports 180 can be located anywhere they are in fluid communication with the second section 4.

Figure 6:
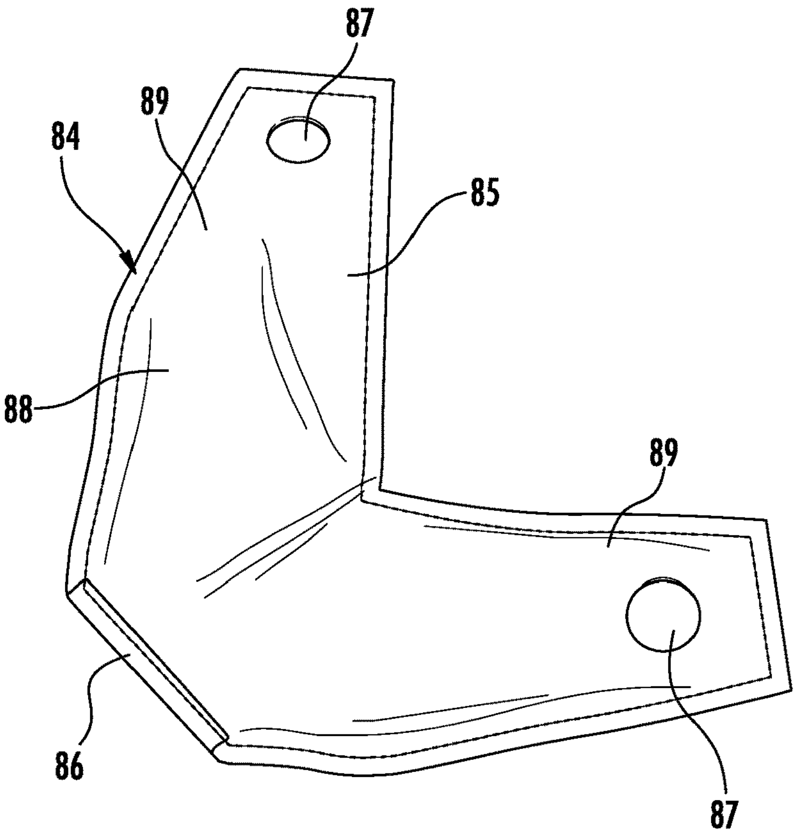
FIG. 6 is a top perspective view of a pocket configured to be connected to the port of the device of FIG. 1, according to an embodiment.

In the embodiment of the device 20 shown in FIGS. 1-5, a user can selectively inflate the first section 2 alone, or both the first section 2 and the second section 4 together. Each inflation port 80, 180 is fluidly coupled to a pocket 85, such that air is directed into the pocket 85 from the air output 81. The pocket 85 is shown in greater detail in FIG. 6. The pocket 85 acts as a valve for controlling and directing the flow of air into the respective first and second cavities 24, 25. The pocket 85 has an entrance opening 86 in communication with the opening 82 of the port 80, 180 and at least one exit opening 87 in communication with the first or second cavity 24, 25. In this embodiment, the pocket 85 contains an exit opening 87 on each of two branches 89 extending away from each other. Exit openings 87 allow airflow from an air output 81 into the cavity of the device 20. The entrance opening 86 in this embodiment is located at the corner of the pocket 85 in order to correspond to the location of the opening 82 on the device 20. The pocket 85 in the embodiment of FIG. 6 has two branches 89 extending away from each other, e.g., to form an L-shape, and the exit openings 87 are located near the ends of the branches 89 to space them from the entrance opening 86 and from each other. The pocket 85 in this embodiment is formed by one or more sheets 88 of flexible material that are folded and/or connected together to define the pocket 85 in the desired shape. In the embodiment of FIG. 6, the pocket 85 is stitched to the inside of the device 20 only around the port 80, 180 and the rest of the pocket 85 is free within the respective cavity 24, 25.

In the embodiment shown, each port 80, 180 is fluidly coupled with one pocket 85. The device 20 further includes a second set of pockets, such as the passage pockets 185, which provide for the flow of air from the second cavity 25 into the first cavity 24 when the air output 81 is coupled to one of the second cavity ports 180. Passage pocket 185 is positioned such that one branch 189 extends along the cavity junction 8 of device 20. A break in the cavity junction 8 forms a hole 182 corresponding to an entrance opening 186 in the branch 189 of passage pocket 185. This entrance opening 186 allows air from the second cavity 24 to flow from the second cavity 25 into the passage pocket 185. The passage pocket 185 also includes exit openings, similar to exit openings 87, which deliver the air into the first cavity 24. Therefore, the passage pockets 185 allow air to flow from the second section 4 to the first section 2.

Port pockets 85 and passage pockets 185, in one embodiment, are configured to allow for selective inflation of the first section 2 and the second section 4. In particular, the first section 2 can be inflated alone or first section 2 and second section 4 can be inflated together. The latter will be described first. When the air output 81 is connected to either of the second set of inflation ports 180 corresponding to the second section 4, pocket 85 receives the air, inflates, and the air flows through exit openings 87 and into the second cavity 25 of the device 20. Air then flows through the holes 182 in cavity junction 8, which are coupled with the entrance openings 186 of the passage pockets 185. From there, the air flows through the exit openings 87 of the passage pockets 185 and into the first cavity 24. In this way, both the first and second cavity 24, 25 will inflate, as shown in FIG. 1. The inflation of passage pockets 185 puts pressure on the port pockets 85 in the first cavity, thereby pressing the sheets 88 together and preventing air flow into pockets 85 and out of the device 20 through the port 80; thus the pockets 85 act as a selective valve. Continued air flow through one of the ports 180 allows for full inflation of the device 20. The fully inflated device 20 allows users to easily transport the device 20 and the patient from one surface to another. In one embodiment, when the first and second cavity 24, 25 are inflated together, the user can use handles 48 to move device 20 from one bed 12 to another.

Other times, it may be useful to have only the first section 2 inflated, as is shown in FIG. 2. When the air output 81 is connected to either of the first set of inflation ports 80 corresponding to the first section 2, pocket 85 receives the air, inflates, and the air flows through exit openings 87 and into the first cavity 24 of the device 20. The inflation of pockets 85 put pressure on the passage pockets 185 in the first cavity, thereby pressing the sheets together and preventing air flow into passage pockets 185 and into the second cavity 25 of the device; thus the passage pockets 185 act as a selective valve preventing the flow of air. The inflated device 20, with only the first section 2 inflated, may be used to position, turn, boost, etc. the patient on a support surface, such as the bed 12. In one embodiment, when the first and second cavities 24, 25 are inflated together, the user can use handles 48 to move device 20 on the bed 12.

When not inflated or in use, second section 4 can be rolled, tucked, folded, or otherwise stored in the deflated state. In the embodiment shown in FIG. 2, second section 4 is rolled and held in place with straps 5, while first section 2 is inflated. In one embodiment the second section 4 can be automatically rolled-back or retracted when the second section 4 or the entire inflatable body 30 is deflated. This can be done by use of one or more retractable elastic straps similar to those described in U.S. Patent Application Publication No. 2017/0119608, entitled "Apparatus and System for Lifting, Moving, Turning, and Positioning a Patient", which is hereby incorporated by reference herein in its entirety. In a further embodiment the second section 4 can be automatically rolled-back or retracted by the use of a pre-coiled, memory-set strip attached to the second section 4. The inflation of the first cavity 2 allows for the boosting, positioning, and turning, etc. of a patient.

Figure 7:
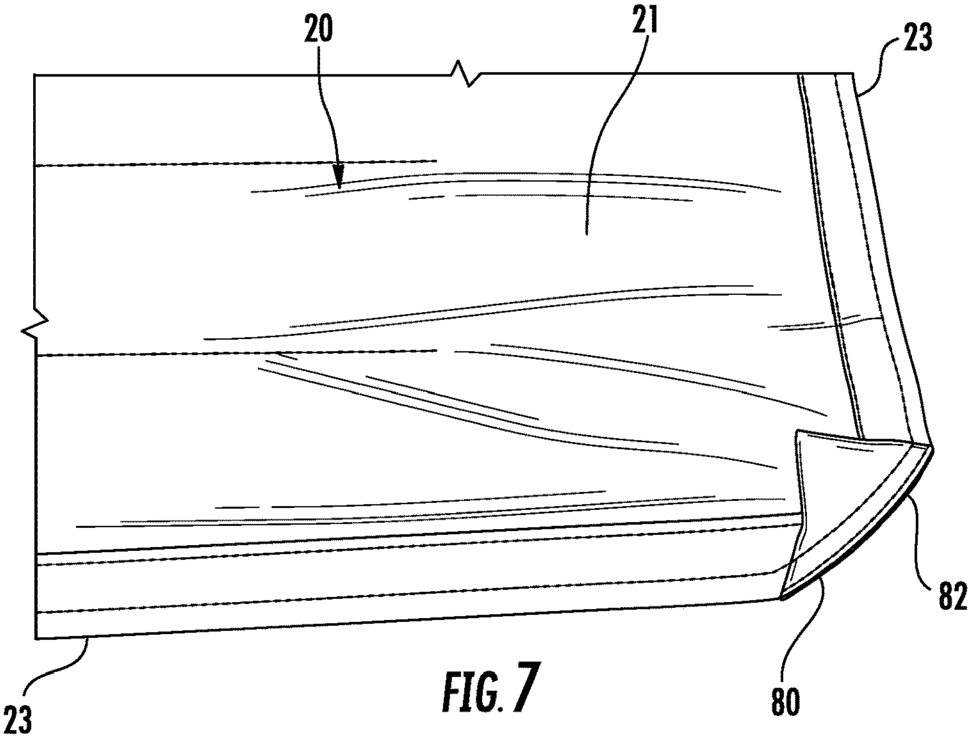
FIG. 7 is a top perspective view of a portion of an inflatable device showing the port, according to an embodiment.
Figure 8:
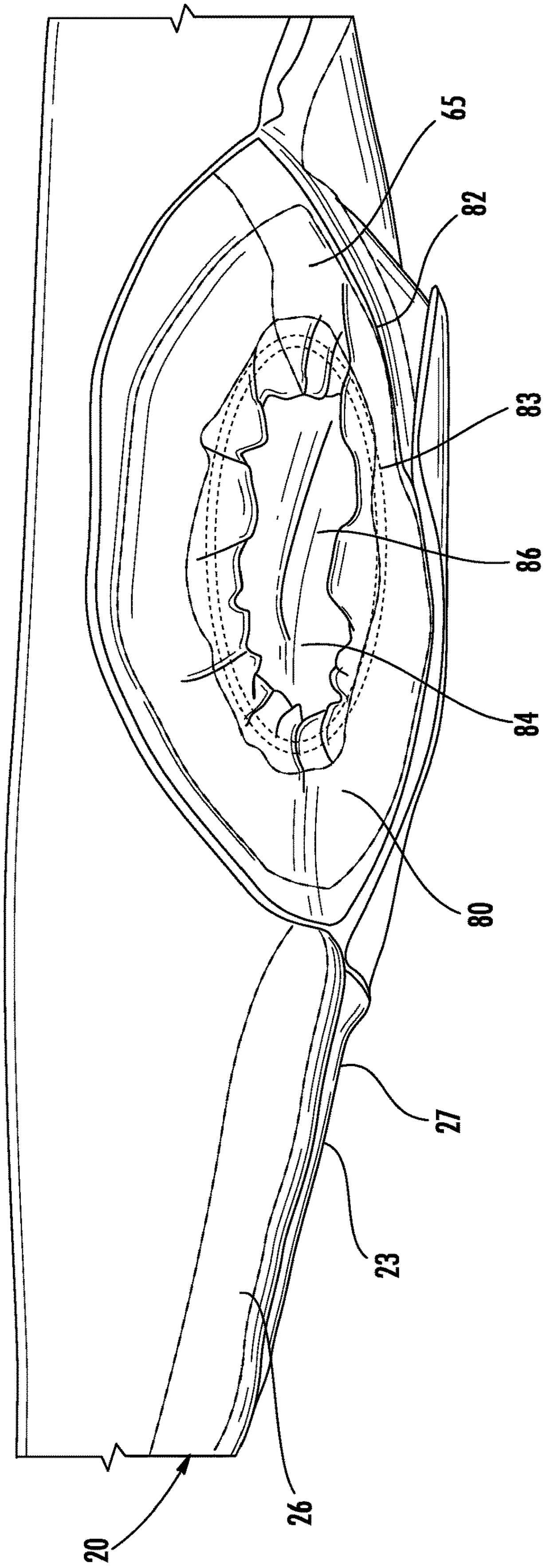
FIG. 8 is a magnified side view of the port of FIG. 7.
Figure 9:
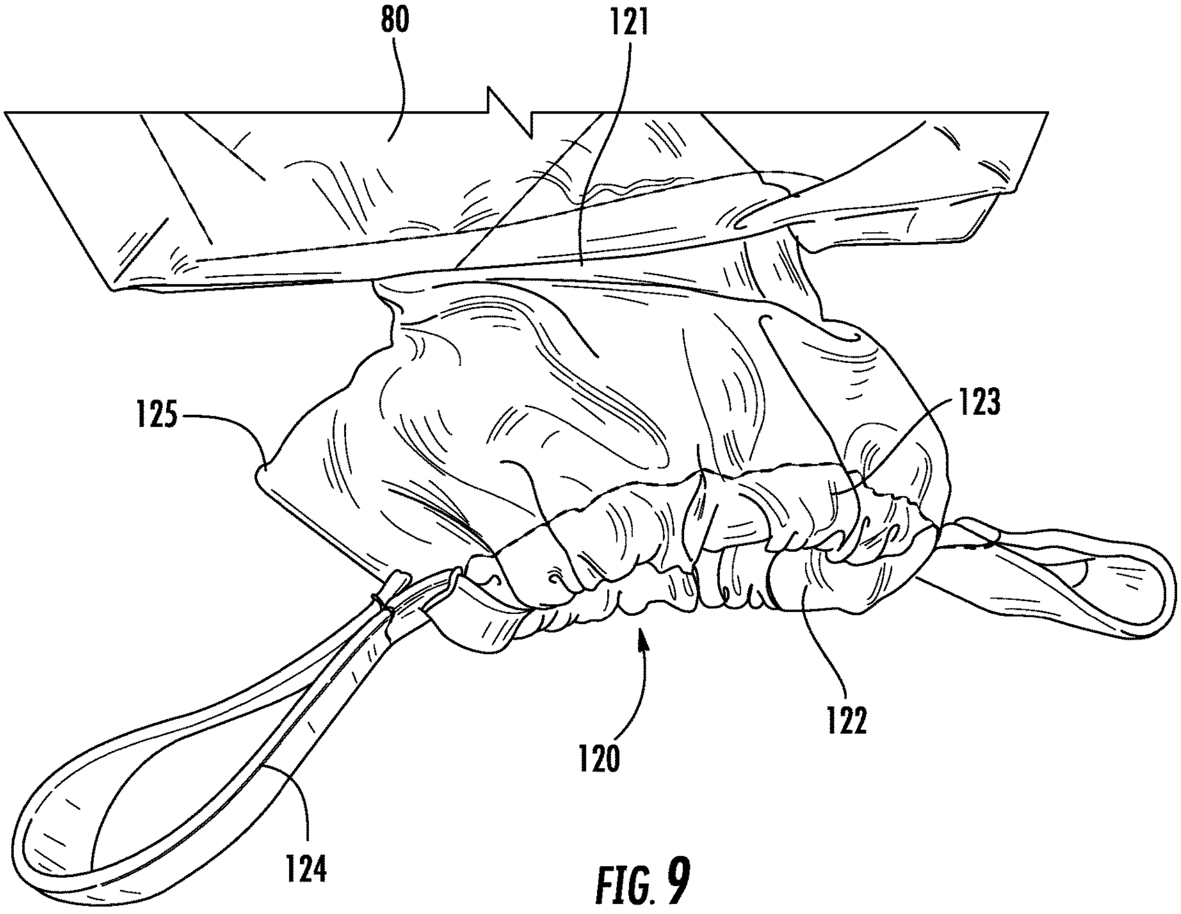
FIG. 9 is a top perspective view of a portion of an inflatable device showing the port, according to another embodiment.

As described above, according to an embodiment, the device 20 includes inflation ports 80, 180. FIGS. 7-9 depict various embodiments of an inflation port that may be used for inflation ports 80, 180. All inflation ports 80, 180 may have the same configuration, or inflation ports 80 may be different than inflation ports 180. The embodiments below are referred to as inflation ports 80, but the features and principles of the inflation ports 80 shown in FIGS. 7-9 and described below are also applicable for inflation ports 180.

In the embodiment shown in FIGS. 7-8, the opening 82 of the inflation port 80 is formed at an approximately 45° angles. A portion of the top sheet and the bottom sheet are folded inwardly onto the top and bottom surfaces 21, 22 of the device 20, respectively, to create this configuration. As shown in FIG. 8, the opening 82 is surrounded by a retaining mechanism 83. In this embodiment, the retaining mechanism 83 is a stretchable or elastic member that is located around at least a portion of each opening 82. The elastic member of the retaining mechanism 83 is schematically illustrated in broken lines in FIG. 8, and may be provided in the form of an elastic ring, a compressible O-ring, or other such structure. Such an elastic member may be included in an annular pocket or cavity formed around the opening 82 by a separate piece 65 of sheet material being stitched or otherwise connected around the opening 82.

As shown in FIG. 9, the device 20 may also include a port sock 120 having a first opening 121 and a second port opening 122. The first opening 121 is configured to attach or connect to port 80 at openings 82 or to pockets 84 (e.g., by sewing first opening 121 to port 80 or to pocket 85). The port sock 120 is connected to the device 20 in such a way that second port opening 122 is not flush with the edges 23 of device 20. In other words, when port sock 120 is attached to device 20, port sock 120 extends out from port 80 of device 20. Extending port sock 120 out from port 80 of device 20 prevents port sock 120 or port 80 from bunching up and ensures that device 20 remains flat. The port sock 120 can extend from the device at any desired angle. For example, the port sock 120 may direct the port opening 122 at 45 degrees from the device 20 or 90 degrees from the side of the device 20.

Port opening 122 of port sock 120 has a retaining mechanism 123, which is provided in the form of an elastic ring. Side handles 124 (e.g., straps or tabs) are disposed at or along an edge of port opening 122 of port sock 120. Side handles 124 are configured to allow for pulling retaining mechanism 123 to stretch open port opening 122 so that an air output 81 can be inserted into port opening 122. Side handles 124 are also configured to allow for pulling retaining mechanism 123 to open port opening 122 for removal of the air output 81. Port sock 120 may also include side pouches 125 configured to engage with a specifically designed nozzle of air output 81, such as the nozzle of air output 81 shown in FIG. 10. The side pouches 125 are a portion of the port sock 120 having an increased diameter relative to the opening 121 and/or 122. In the embodiment shown, the side pouches 125 are two oppositely disposed peak-shaped portions, formed by an increase in diameter from the opening 122 to a maximum pouch diameter, and then decreasing back down to the diameter of the opening 121.

Figure 10:
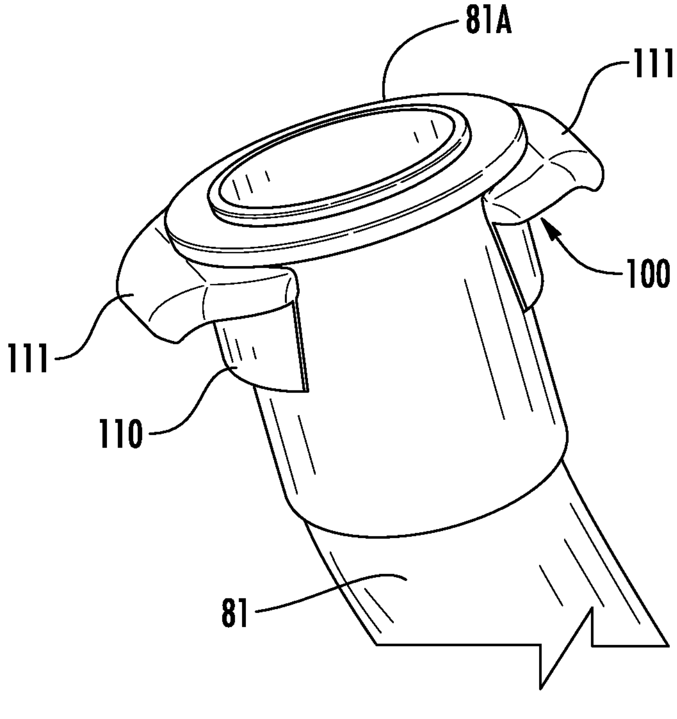
FIG. 10 is a side view of a nozzle portion of an air output, according to an embodiment.

A nozzle of an air output 81 which is configured to be disposed within port opening 122 is show in FIG. 10. A clip 100 is configured to be disposed on a lip 81*a* of the nozzle of the air output 81 or otherwise around a distal portion of the nozzle 81. Clip 100 has a C-shape such that it can be easily put on and taken off of the nozzle 81. Clip 100 has any suitable configuration or design. For example, clip 100 includes extended side portions (e.g., flanges) 111 disposed along a front surface of clip 100 and which are configured to bend away from the front surface of clip 100 and a protrusion 110 which extends out and away from the top surface of clip 100. Clip 100 is configured such that when clip 100 is installed on the nozzle and the nozzle is placed in port sock 122, the extended side portions (e.g., flanges) 111 of clip 100 are disposed within side pouches 125 of port sock 120. Clip 100 is configured such that when it is installed on the nozzle, protrusion 110 of clip 100 wraps around an outer surface of nozzle 81 in a secure fit. Alternatively, protrusion 110 of clip 100 is configured to snap into an inner surface of nozzle 81. Clip 100 is configured to prevent unintentional disengagement of the nozzle from opening 82 or pockets 85 due to its increased diameter relative to the port opening 122. Additionally, the downward bend of extended side portions 111 are configured to prevent unintentional disengagement of the nozzle from opening 82. Also, clip 100 is configured to prevent the nozzle from rotating relative to port opening 122 when the nozzle is disposed within port opening 122 because of the corresponding shape of the clip 100 with the side pouches 125 which allow positioning of the clip 100 in the port sock 120 in substantially only that orientation. In some aspects, clip 100 may be removable. In some aspects, clip 100 is manufactured as a single, unitary component with the nozzle.

Figure 11:
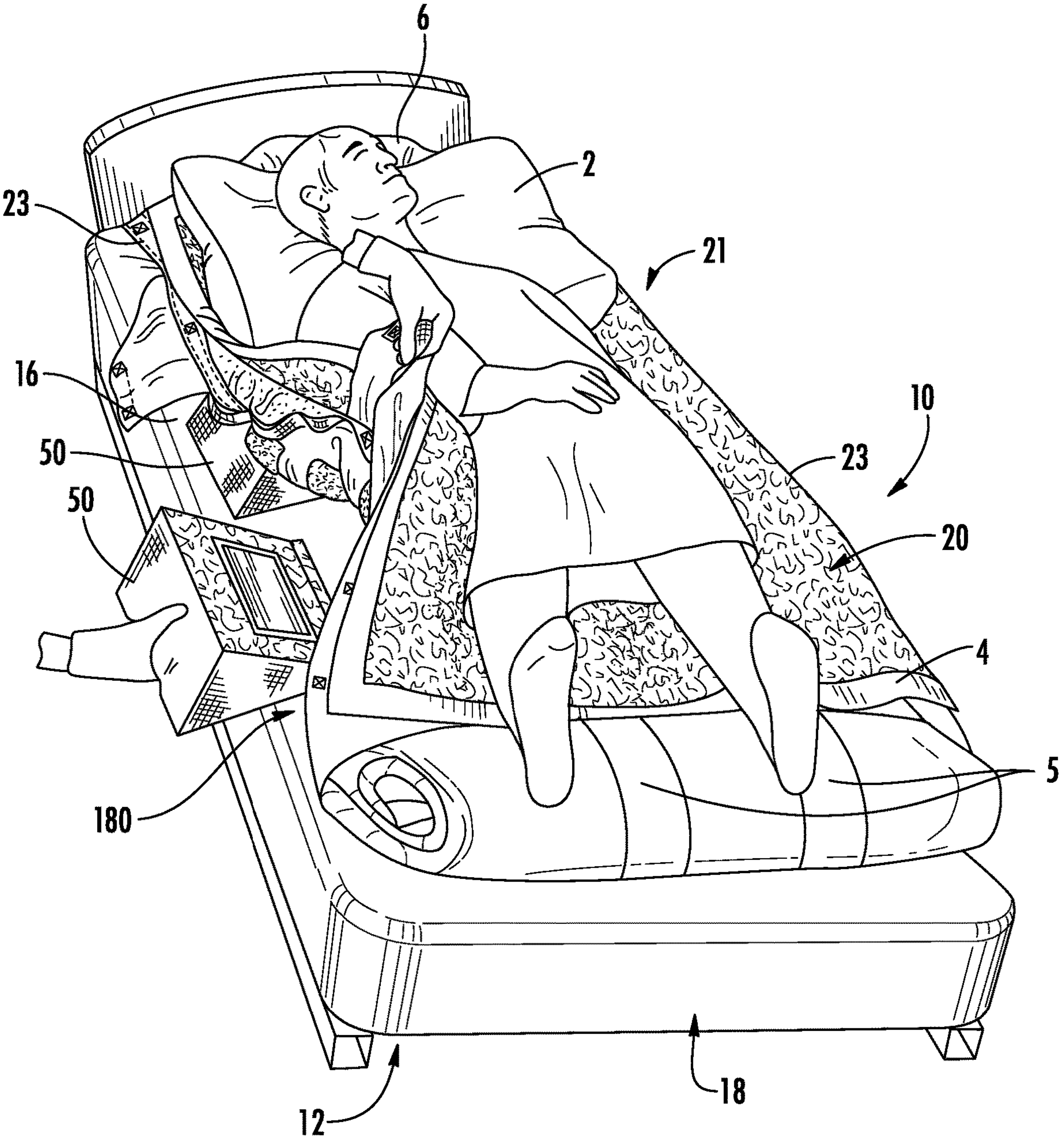
FIG. 11 is a perspective view of a caregiver inserting wedges underneath the inflatable device of FIG. 1, according to an embodiment.

As depicted in FIG. 11, the device 20 may be used in connection with one or more wedges 50. FIG. 11 illustrates an example embodiment of a method for placing the patient in an angled resting position by placing two wedges 50 under the patient resting on an inflated device 20. As shown, the edge of the device 20 is lifted, and the wedges 50 are inserted from the side of the bed 12 under the device 20 toward the patient. Once the wedges 50 have been inserted, the patient may be in the proper angled position. Positioning the wedges 50 in this arrangement can result in lower pressure in the sacral area, which can reduce the occurrence of pressure ulcers in the patient. Examples of methods for placing an inflatable device beneath the patient and for positioning wedges under an inflatable device, and which can be utilized with the device 20 and wedges 50 described herein, are shown and described in U.S. Pat. No. 9,849,053, which is hereby incorporated by reference herein in its entirety.

The device 20 and/or any elements thereof may be reprocessed for reuse and/or resale. Reprocessing of the device would include steps such as inspecting the device, removing foreign particles, stains, or odors by washing one or more surfaces of the device, repairing tears or damage to the device, repairing or supplementing the stitching, such as at the seams, replacing any elements or components, replacing missing items from a kit of inflatable devices 20, etc. Reprocessing would also include decontaminating a device 20 to remove all or a substantial amount of microorganisms, such as by sterilization means, such as the use of gamma radiation, electron-beam radiation, X-ray radiation, Ethylene oxide (EtO), steam, such as through the use of an autoclave, or any combination thereof. And, reprocessing would include repackaging any of the devices and elements thereof. The device may then be reused and/or resold.

US Patent Application Publication Nos. 2017/0049646 and 2017/0216117, both entitled “Apparatus and System for Boosting, Transferring, Turning and Positioning a Patient” describe various features of an inflatable device that can be incorporated into and used with the device 20 described herein, including but not limited to selective glide assemblies to permit and resist sliding of the components relative to each other in certain directions, which may be used with device 20. Furthermore, the pockets 85, passage pockets 185, wedge 50, ports 80, 180, air output 81 and other elements described herein may also incorporate the features, elements, configurations, and design of like components that are described in US Patent Application Publication Nos. 2017/0049646 and 2017/0216117. US Patent Application Publication Nos. 2017/0049646 and 2017/0216117 are hereby incorporated by reference herein in their entireties.

While the apparatus is capable of embodiment in many different forms, certain embodiments are shown in the drawings and described herein in detail. These embodiments are to be considered as an example and are not intended to limit the broad aspects of the apparatus to the embodiments illustrated and described. The features of the individual embodiments may be used in several possible combinations and variations of the components. Any of the embodiments could be provided in any combination with the other embodiments disclosed herein. An apparatus as described herein may be embodied in other specific forms without departing from the spirit or central characteristics thereof. The present examples and embodiments, therefore, are to be considered in all respects as illustrative and not restrictive. The terms "first," "second," "top," "bottom," etc., as used herein, are intended for illustrative purposes only and do not limit the embodiments in any way. In particular, these terms do not imply any order or position of the components modified by such terms. Further, "providing" an article or apparatus, as used herein, refers broadly to making the article available or accessible for future actions to be performed on the article, and does not connote that the party providing the article has manufactured, produced, or supplied the article or that the party providing the article has ownership or control of the article.

What is claimed is:

1. An inflatable device for transferring or positioning a person on a support surface, comprising:

a top sheet and a bottom sheet defining a cavity having a first peripheral edge and a second peripheral edge opposite the first peripheral edge, and configured to be inflated such that the top sheet forms a top wall of the cavity and the bottom sheet forms a bottom wall of the cavity;

a cavity junction extending from the first peripheral edge to the second peripheral edge of the cavity and formed by directly connecting the top sheet to the bottom sheet such that a surface of the top wall contacts a surface of the bottom wall, the cavity junction configured to separate the cavity into a first cavity and a second cavity, and wherein the cavity junction comprises a portion where the top sheet and bottom sheet are unconnected to form an opening configured to allow air flow from the second cavity into the first cavity;

a first port having a first opening in fluid communication with the first cavity and configured to provide passage of air into the first cavity;

a second port having a second opening in fluid communication with the second cavity and configured to provide passage of air into the second cavity; and a port pocket having an entrance opening in fluid communication with the first port, wherein the port pocket acts as a selective valve for allowing the passage of air between the first port and the first cavity;

a passage pocket positioned entirely within the first cavity and overlapping at least a portion of the port pocket, the passage pocket having an entrance opening in fluid communication with the opening in the cavity junction, wherein the passage pocket acts as a selective valve for allowing the passage of air between the second cavity and the first cavity;

wherein the device is configured to be inflated in a first configuration wherein the first cavity is inflated and the second cavity is not inflated by coupling an air output to the first port;

and wherein the device is configured to be inflated in a second configuration wherein the first cavity and the second cavity are both inflated by coupling an air output to the second port.

2. The inflatable device of claim 1, further comprising:

a third port having a third opening in fluid communication with the first cavity and configured to provide a third air input for inflating the first cavity; and a fourth port having a fourth opening in fluid communication with the second cavity and configured to provide a fourth air input for inflating the second cavity.

3. The inflatable device of claim 1, wherein air flow through the first port causes inflation of the port pocket which puts pressure on the passage pocket in the first cavity and prevents air flow into the passage pocket and into the second cavity of the device; and wherein air flow through the second port and the opening causes inflation of the passage pocket which puts pressure on the port pocket and prevents air flow into the port pocket and out of the device through the first port.

4. The inflatable device of claim 3, wherein the pocket comprises an exit opening for the passage of air from the pocket to the first cavity.

5. The inflatable device of claim 3, wherein the pocket is substantially L-shaped, and further comprises at least two branches.

6. The inflatable device of claim 5, wherein each branch carries an exit opening at a distal end thereof.

7. The inflatable device of claim 1, wherein the passage pocket comprises at least one exit opening for the passage of air from the pocket to the first cavity.

8. The inflatable device of claim 7, wherein the passage pocket is substantially L-shaped, and further comprises at least two branches, each branch carrying one of the at least one exit opening at a distal end thereof.

9. The inflatable device of claim 1, wherein the passage pocket is configured to take on a compressed configuration when air is being delivered through the first port, to prevent air from passing through the opening in the cavity junction into the second cavity and thereby inflate the device in the first configuration, and is configured to take on an open configuration when air is being delivered through the second port, to allow air to pass from the second cavity into the first cavity through the passage pocket and thereby inflate the device in the second configuration.

10. A method of inflating an inflatable device for transferring or positioning a patient on a support surface, the method comprising:

placing an inflatable device on a support surface;

positioning a patient on the inflatable device;

coupling an air output to one of a first port or a second port to inflate at least a portion of the inflatable device, wherein the first port has a first opening in fluid communication with a first cavity of the inflatable device and is configured to provide passage of air into the first cavity, and wherein the second port has a second opening in fluid communication with a second cavity of the inflatable device and configured to provide passage of air into the second cavity; and wherein a cavity junction extends from a first peripheral edge of the inflatable device to a second peripheral edge of the inflatable device and separates the first cavity from the second cavity, wherein the cavity is formed by directly connecting the top sheet to the bottom sheet such that a surface of the top sheet contacts a surface of the bottom sheet and wherein the cavity junction comprises a portion where the top sheet and bottom sheet are unconnected to form an opening configured to allow air flow from the second cavity into the first cavity;

wherein the inflatable device comprises a port pocket having an entrance opening in fluid communication with the first port, wherein the port pocket acts as a selective valve for allowing the passage of air between the first port and the first cavity;

wherein the inflatable device further comprises a passage pocket positioned entirely within the first cavity and overlapping at least a portion of the port pocket, the passage pocket having an entrance opening in fluid communication with the opening in the cavity junction, wherein the passage pocket acts as a selective valve for allowing the passage of air between the second cavity and the first cavity;

wherein coupling the air output to the first port inflates the first cavity such that the second cavity is not inflated and wherein coupling the air output to the second port inflates the first cavity and the second cavity.

11. The method of claim 10, further comprising:

coupling the air output to the first port;

delivering air through the first port, causing the passage pocket to take on a compressed configuration thereby preventing air from passing from the first cavity into the second cavity; and inflating the first cavity.

12. The method of claim 11, further comprising securing a portion of the device comprising the uninflated second cavity in a stowed position.

13. The method of claim 10, further comprising:

coupling the air output to the second port;

delivering air through the second port, causing air to move into the second cavity and through the opening in the cavity junction, causing the passage pocket to take on an open configuration thereby allowing air to pass from the second cavity into the first cavity; and inflating the first cavity and the second cavity.

14. The method of claim 10, further comprising using the inflatable device with the inflated first cavity for positioning the patient on the support surface and using the inflatable device with the inflated first and second cavities for transferring the patient from the support surface to a second support surface.

15. An inflatable device for transferring or positioning a person on a support surface, comprising:

a top sheet and a bottom sheet defining a cavity configured to be inflated such that the top sheet forms a top wall of the cavity and the bottom sheet forms a bottom wall of the cavity;

the cavity having a first peripheral side edge, a second peripheral side edge opposite the first peripheral edge, a head edge between the first peripheral side edge and the second peripheral side edge, and a foot edge opposite the head edge, wherein the head edge and the foot edge are shorter than the first peripheral side edge and the second peripheral side edge;

a cavity junction formed by directly connecting the top sheet to the bottom sheet such that a surface of the top wall contacts a surface of the bottom wall, the cavity junction comprising a portion where the top sheet and bottom sheet are unconnected to form an opening in the cavity junction, the cavity junction extending from the first peripheral side edge to the second peripheral side edge of the cavity and connecting the top sheet and the bottom sheet and configured to separate the cavity into a first cavity and a second cavity, wherein the opening in the cavity junction is configured to allow air flow from the second cavity into the first cavity;

wherein the first cavity is defined by a first portion of the first peripheral side edge, the head edge, a first portion of the second peripheral side edge, and the cavity junction;

wherein the second cavity is defined by a second portion of the first peripheral side edge, the foot edge, a second portion of the second peripheral side edge, and the cavity junction;

a first port having a first opening in fluid communication with the first cavity and configured to provide passage of air into the first cavity;

a retention mechanism configured to retain a stored portion of the top sheet and the bottom sheet forming the second cavity; and a second port having a second opening in fluid communication with the second cavity and configured to provide passage of air into the second cavity;

a port pocket having an entrance opening in fluid communication with the first port, wherein the port pocket acts as a selective valve for allowing the passage of air between the first port and the first cavity;

a passage pocket positioned entirely within the first cavity and overlapping at least a portion of the port pocket, the passage pocket having an entrance opening in fluid communication with the opening in the cavity junction, wherein the passage pocket acts as a selective valve for allowing the passage of air between the second cavity and the first cavity;

wherein the device is configured to be inflated in a first configuration wherein the first cavity is inflated and the second cavity is not inflated by coupling an air output to the first port;

wherein the stored portion of the top sheet and the bottom sheet forming the second cavity may be retained by the retention mechanism when the second cavity is not inflated; and wherein the device is configured to be inflated in a second configuration wherein the first cavity and the second cavity are both inflated by coupling an air output to the second port.

* * * * *